(12) United States Patent  (10) Patent No.: US 8,417,819 B2
Parkinson  (45) Date of Patent: Apr. 9, 2013

(54) COMBINING UNIX COMMANDS WITH UNIFORM RESOURCE LOCATORS

(75) Inventor: Steven W. Parkinson, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 521 days.

(21) Appl. No.: 11/982,980

(22) Filed: Nov. 5, 2007

(65) Prior Publication Data

US 2009/0119405 A1    May 7, 2009

(51) Int. Cl.
*G06F 15/16* (2006.01)
(52) U.S. Cl. ............................. 709/227; 340/2.8; 340/2.9
(58) Field of Classification Search .................. 709/203, 709/206, 238, 245, 217, 218, 219, 220, 223, 709/225, 227, 230, 233, 224, 226, 204; 370/252, 370/352, 392, 230, 233, 238; 707/104.1, 707/3, 4, 5, 9; 715/201, 205, 234, 236, 264; 719/313; 726/3, 25, 23
See application file for complete search history.

(56) References Cited

U.S. PATENT DOCUMENTS

| 6,766,454 | B1 * | 7/2004 | Riggins ........................... 713/185 |
| 7,453,593 | B1 | 11/2008 | Parkinson |
| 2002/0143551 | A1 * | 10/2002 | Sharma et al. ............. 704/270.1 |
| 2004/0010781 | A1 * | 1/2004 | Maly et al. ..................... 717/143 |
| 2004/0103407 | A1 * | 5/2004 | Blaukopf et al. ............. 717/140 |
| 2004/0207657 | A1 * | 10/2004 | Svendsen ....................... 345/738 |
| 2004/0243543 | A1 * | 12/2004 | Snover .............................. 707/1 |
| 2008/0016143 | A1 * | 1/2008 | Bumpus et al. ................ 709/203 |

OTHER PUBLICATIONS

Betrands Portier, Invoking Web Service with Java clients, IBM, http://www.ibm.com/developerworks/webservices/library/ws-javaclient/index.html.*
Robert I Pitts, UNIX Commands, BU CAS CS, http://www.cs.bu.edu/teaching/unix/reference/commands.html.*
Sun Microsystems, Runtime (Java 2 Plateform SE v1.4.2, Sun Microsystems, Inc. http://java.sun.com/j2se/1.4.2/docs/api/java/lang/Runtime.html.*

* cited by examiner

*Primary Examiner* — David Lazaro
*Assistant Examiner* — Charles Murphy
(74) *Attorney, Agent, or Firm* — Lowenstein Sandler LLP

(57) ABSTRACT

A computer command processor to prepare a data processing pipeline where an output of a first process is provided as an input of a second process, wherein the first process and the second process execute at different computer systems. Systems (and the processes that are to occur there) are identified by Uniform Resource Locators ("URLs").

18 Claims, 9 Drawing Sheets

COMBINING UNIX COMMANDS WITH UNIFORM RESOURCE LOCATORS

FIELD

The invention relates to modular data processing techniques. More specifically, the invention relates to techniques for incorporating local and remote data processing stages in a processing pipeline.

BACKGROUND

UNIX® is a registered trademark referring to a computer operating system ("OS") developed at Bell Labs in about 1969, but the term has become associated with a number of operating systems that merely share some characteristics with the original OS. In the present disclosure, the word Unix will be used to denote UNIX® and UNIX-like operating systems, including BSD (a variant of UNIX), LINUX® (an independently-developed OS with many points of similarity), Mac OS® X (an operating system derived from BSD that is commonly used on Macintosh® computers from Apple Computer Corporation of Cupertino, Calif.), and other systems that encourage or support the pipelined data processing techniques described below.

In a Unix system, a variety of small, single-purpose (or limited-purpose) applications is usually provided, and sophisticated data manipulations can be accomplished by setting up a "pipeline" of these small applications, each application to perform a stage or step of the complete manipulation. Such a pipeline may be defined or expressed as a textual command:

```
data-generator|step-1|step-2| ... |data-consumer          Listing 1
```

The vertical bars ("|") in Listing 1 are pronounced "pipe" when the command is read aloud. The command above expresses a data processing pipeline in which a program named data-generator produces some sort of information, which is passed (as if through a pipe) to a second program, step-1, that performs a first manipulation. The manipulated data from step-1 is in turn passed to step-2 for further manipulation, and so on, until the processed data finally makes it to data-consumer for disposition. For example, data-consumer may store the processed data in a file, print it, operate a machine according to the processed data, etc.

Applications or "utilities" that can be used in a data processing pipeline operate to receive data from a predetermined source known as the "standard input," and send their results to a predetermined destination known as the "standard output." Informational and error messages may be emitted on a "standard error," and systems often arrange for these messages to be displayed to the user. A pipeline is constructed by connecting the standard output of one program to the standard input of the next program using an interprocess communication facility.

Data pipelines provide an easy way to express a complicated sequence of manipulations from a command-line user interface ("UI"), where a computer user types commands to be executed, on a keyboard. Such command-line interfaces ("CLI") were in widespread use for many years, and have survived for certain applications despite the current popularity of graphical user interfaces ("GUIs"). CLIs are often easier to use in setting up Unix-style data processing pipelines, while GUIs provide a more intuitive paradigm for controlling large, monolithic applications with many built-in features and options.

Novel extensions to the traditional CLI pipeline setup syntax can provide easy control of distributed data processing operations.

BRIEF DESCRIPTION OF DRAWINGS

Embodiments of the invention are illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

DETAILED DESCRIPTION

A traditional Unix data processing pipeline includes two or more pipeline stages connected by an interprocess communication facility known as a "pipe," where an earlier stage emits or writes data which is subsequently read and processed by a following stage. Embodiments of the invention direct stages of a pipeline to carry out their functions at computers or other processing systems that may be different from preceding or succeeding stages. A simple, flexible command syntax allows this process-directing functionality to be used from a standard command-line interface ("CLI"). Other embodiments of the invention are suitable for graphical user interface ("GUI") applications.

Figure 1:
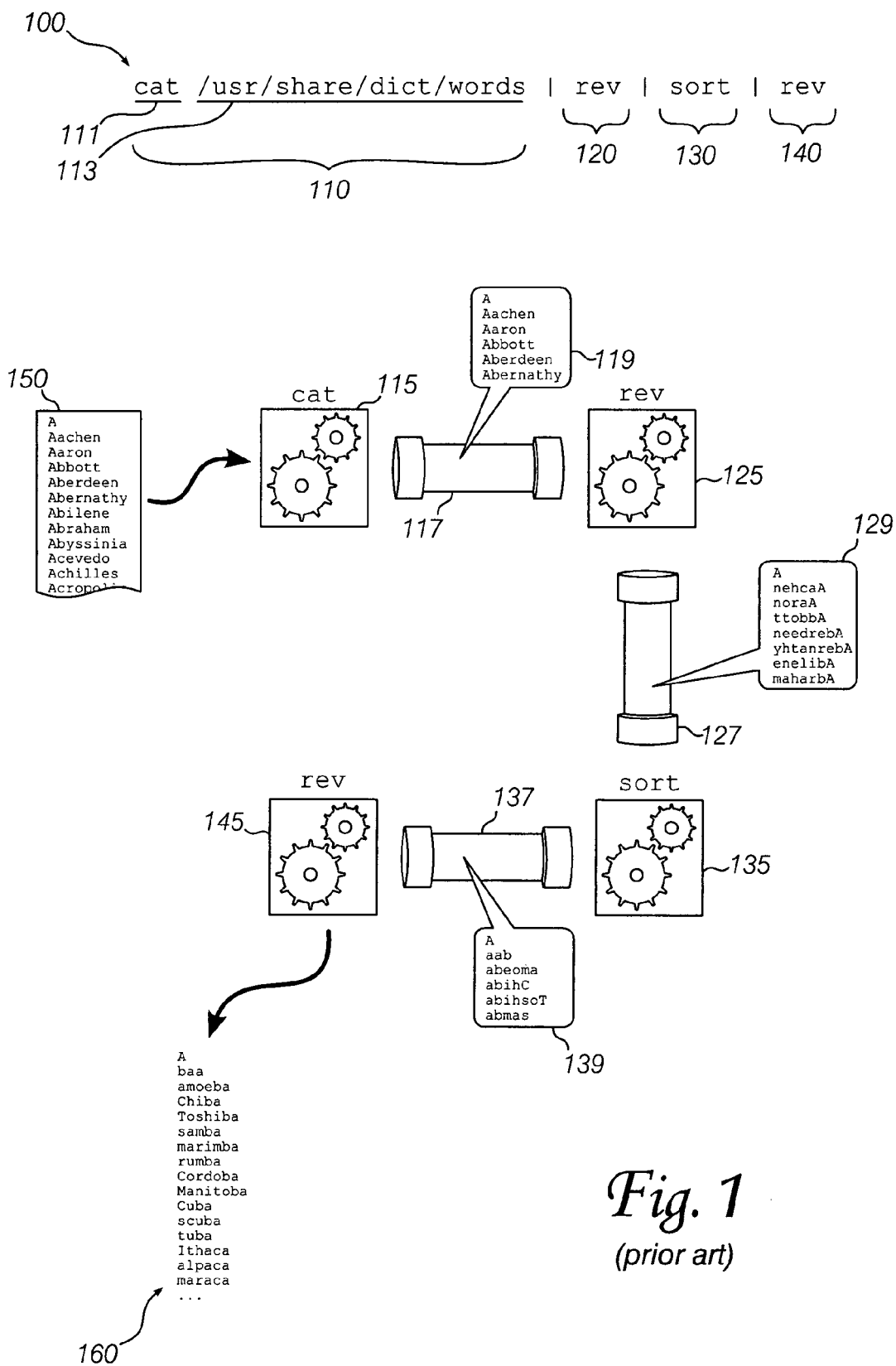
FIG. 1 shows a prior-art, single-machine process pipeline.

FIG. 1 shows a command line 100 including four commands: cat 110, rev 120, sort 130 and rev (again) 140. Each pair of commands has a vertical bar ("|" or "pipe") separating them. A command interpreter (often a "command shell" or just "shell") parses command line 100 and sets up processes corresponding to each command, with interprocess communication pipes between them. Cat process 115 reads data from a file 150 (the name of this file was given as an argument 113 to the cat command name 111). Cat process 115 emits (outputs, writes) data from file 150 into pipe 117 (element 119 shows some of this data). Rev process 125 reads data from pipe 117, reverses the letters of each line, and writes the reversed lines to pipe 127 (some reversed lines are shown at element 129). The sort process 135 reads the reversed lines from pipe 127 and sorts them alphabetically, writing the sorted results to pipe 137 (element 139 shows some sorted lines). Finally, the second rev process 145 reads the reversed, sorted lines from pipe 137 and reverses the letters of each line, restoring the words to their proper lexical order. The output 160 of rev process 145 is the words from file /usr/share/dict/ words, sorted in reverse alphabetical order (where "reverse" does not mean "Z to A," but rather, that the words are compared from end to beginning).

Figure 2:
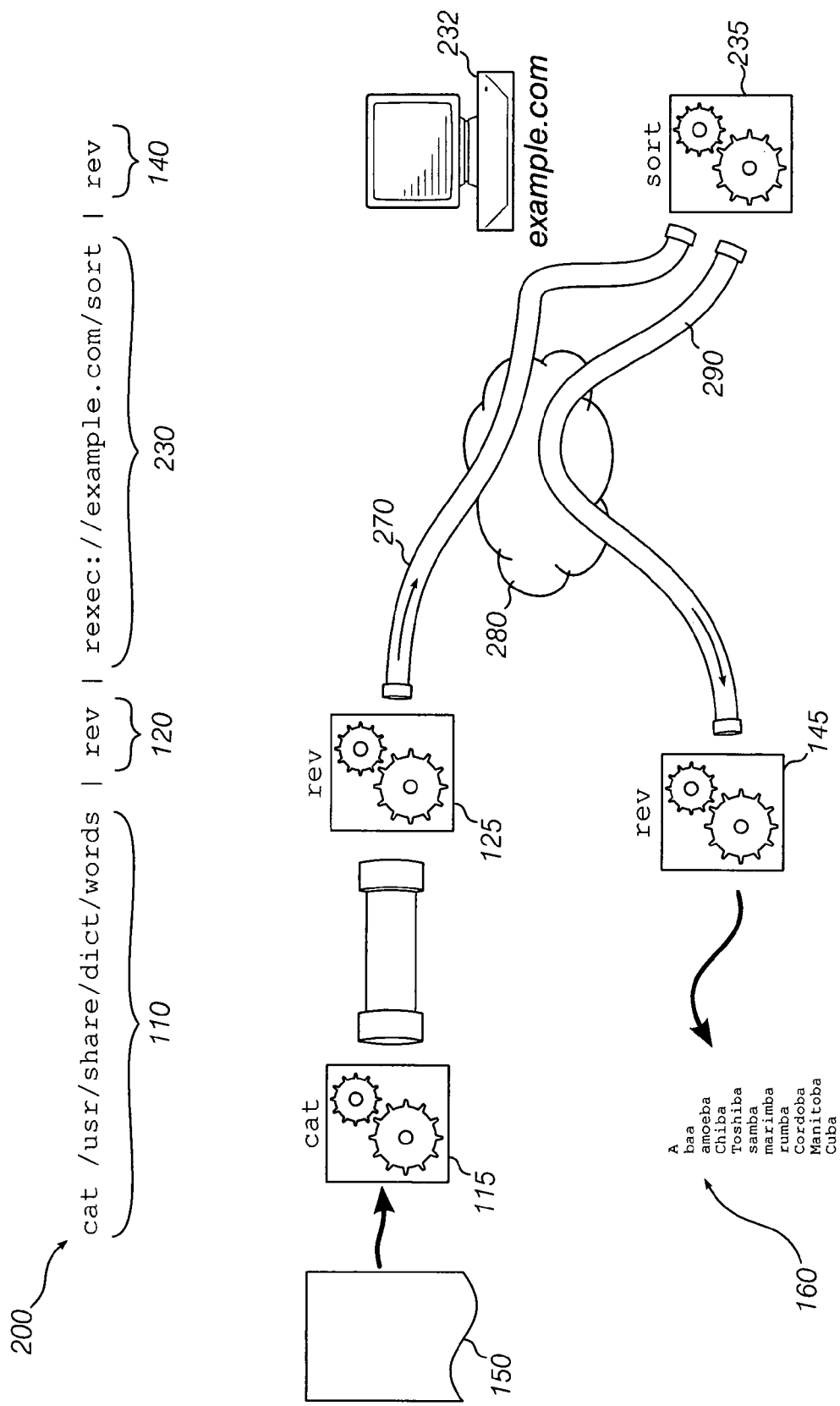
FIG. 2 shows a process pipeline that incorporates a processing stage occurring at a remote machine according to an embodiment of the invention.

FIG. 2 shows a command line 200 that accomplishes the same result as command line 100 shown in FIG. 1, but does so using an embodiment of the invention to arrange for part of the processing of the pipeline to occur on a remote machine. As before, command portion 110 causes a cat process 115 to read data from a file 150 and send it via an interprocess communication pipe to rev process 125. Command portion 230 causes a sort process 235 to be executed at remote system 232, and inter-machine communication channels 270 and 290 are created to carry data to and from sort process 235. Communication channels 270 and 290 may be established over a distributed data network 280 such as the Internet. Sort process 235 receives data from rev process 125, sorts it alphabetically, and returns the sorted data to the second rev process 145, which reverses the letters of each line and emits the same sorted list of words 160.

Figure 3:
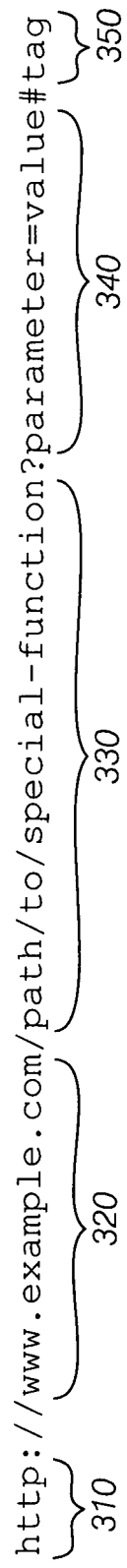
FIG. 3 illustrates some fields that make up a Uniform Resource Locator ("URL").

FIG. 3 shows a standard-form Uniform Resource Locator ("URL"), similar to element 230 in FIG. 2. URLs like these conform to the Internet Engineering Task Force ("IETF") Request for Comments ("RFC") document number 1738, published June 1995. RFC1738 contains a large number of variations, but for the purposes of this disclosure, it is sufficient to understand that a URL generally includes a scheme portion 310, a network location portion 320, a path (resource) portion 330, and may include parameters 340 and/or a fragment identifier 350. Portions are separated by predetermined characters or character strings that facilitate machine processing of the URL. For example, the scheme portion 310 and the network location portion 320 are separated by the three characters "://". A URL is a convenient way of expressing information of use to an embodiment of the invention: the location of a remote machine where some processing of a command pipeline is to take place, the protocol that should be used in communicating with that machine, and the command or process that is desired to occur there. Some embodiments may use alternate representations for this information, but the use of URLs is preferred.

Figure 4:
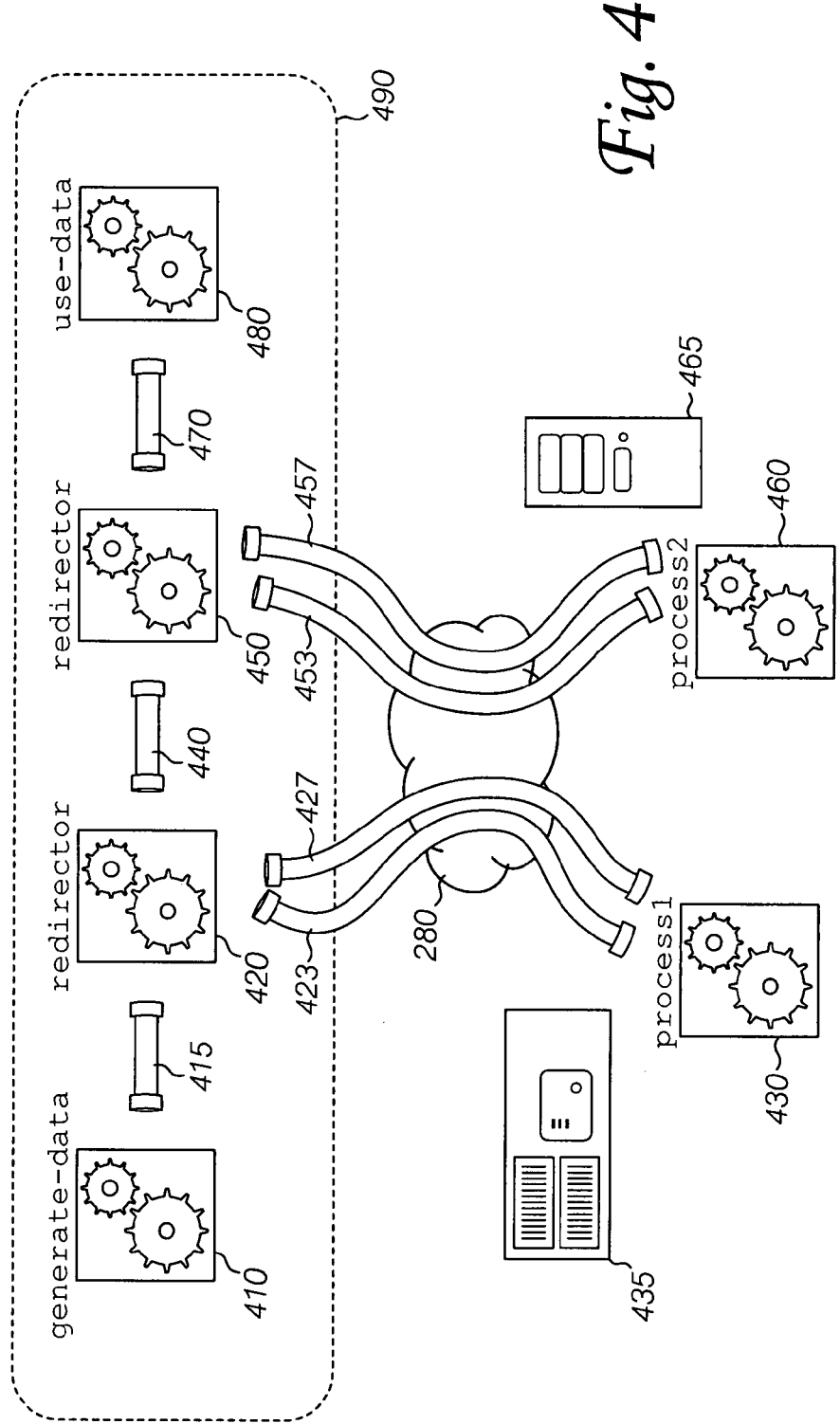
FIG. 4 shows a process pipeline, including two remote processes, constructed according to an embodiment of the invention.

FIG. 4 shows a command line 400 and a set of processes 490 executing at one machine that may be set in motion. A generate-data process 410 produces data that is to be operated on by the other processes. This data flows through pipe 415 to a first redirector process 420. Redirector 420 serves as a local endpoint for communication with remote process 430, executing at machine 435, that corresponds to the URL rexec://machine1/process1. That is, data from pipe 415 is transmitted to process1 433 via an inter-machine "pipe" 423, and data from process1 430 is returned to redirector 420 via pipe 427. Pipes 423 and 427 may be, for example, Transmission Control Protocol ("TCP") or User Datagram Protocol ("UDP") connections.

Processed data returning from process1 430 is forwarded through pipe 440 to the second redirector process 450. Redirector 450 serves as a local endpoint for process2 460 executing at remote machine 465, as specified by the URL rexec://machine2/process2 in command line 400. Data from pipe 440 is copied to pipe 453 and sent to process2 460 via distributed data network 280. Processed data returns via pipe 457 and redirector 450 forwards it through pipe 470 to the final process in the pipeline, use-data 480. Use-data may save, print, or make other use of the processed data.

An existing program called wget, available on many Unix machines, operates somewhat like the redirector processes shown in FIG. 4, but wget lacks the ability to accept input data from a pipe and transmit it to a remote process. One embodiment of the invention is based on wget, with a modification to permit its use in the pipeline mode discussed here. The modification would cause wget to read its standard input and format the data it obtains so that the remote process (e.g. a web server or web service application) can accept and act on it. Wget can be modified to refer to the URL to determine what formatting is appropriate.

Figure 5:
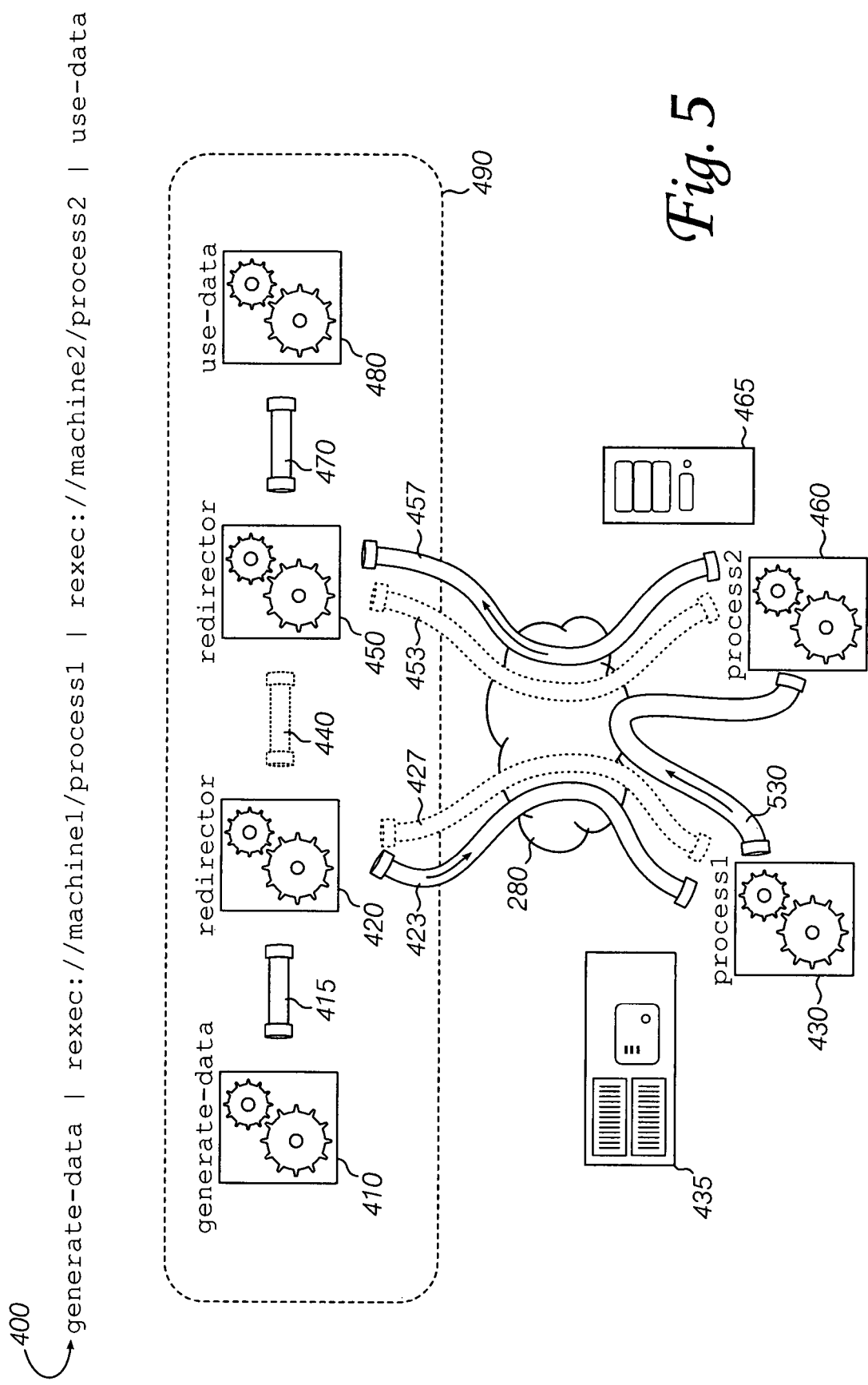
FIG. 5 shows how the process pipeline of FIG. 4 can be optimized.

FIG. 5 shows how another embodiment of the invention would work with command line 400 from FIG. 4. Most of the elements are the same, but this embodiment arranges for process1 430 at machine1 435 to send its output directly to process2 460 at machine2 465, instead of returning it to the local machine via pipe 427 and forwarding it to process2 via pipe 440, redirector 450 and pipe 453. This embodiment replaces interprocess communication channels 427, 440 and 453 with a single interprocess communication channel 530. This arrangement relieves network bandwidth pressure on the local system, and the redirector processes 420 and 450 could be consolidated into a single process (consolidation not shown in this figure).

Data processing pipelines like those discussed above are constructed by a command interpreter ("command shell" or "shell") in response to a command line entered by a user (or otherwise presented to the shell for execution). With a redirector process at the local machine, an ordinary shell can set up multi-machine pipelines like that shown in FIG. 4. A modified shell can set up the optimized pipeline shown in FIG. 5 (the shell must understand that process 1 will send data directly to process2, so the process1-process2 portion of the pipeline should be treated locally as a single unit). A modified shell that recognizes URLs (or constructs that express similar information) in a command line can set up a pipeline like that shown in FIG. 2, where the output of rev process 125 is sent directly to sort process 235 via an inter-machine pipe 270, and the output of sort process 235 is returned to the second rev process 145 via a similar pipe, without the use of a redirector process.

Unix command interpreters like the Bourne shell ("sh"), C shell ("csh"), the Bourne-again shell ("bash"), and others, can be modified to support this sort of direct connection because a basic system operational principle is that "everything is a file." That is, a program's input may come from a data file or from another program (even a program executing on a different machine), but the source of the program's input data is often irrelevant to the program's own operation, so the program can simply treat it as a file-like source. Similarly, a program's output may be stored in a file or sent to another program via a pipe, but the eventual destination of its output is of little concern to the program. This principle is not as fundamentally respected in some other operating systems (for example, in the Windows® family of operating systems from Microsoft Corporation of Redmond, Wash.), but even there, facilities are usually provided so that a pipeline of processes can be constructed; and within such a pipeline, an interprocess connection to a local process may be largely equivalent to an interprocess connection to a process executing at a remote machine.

Figure 6:
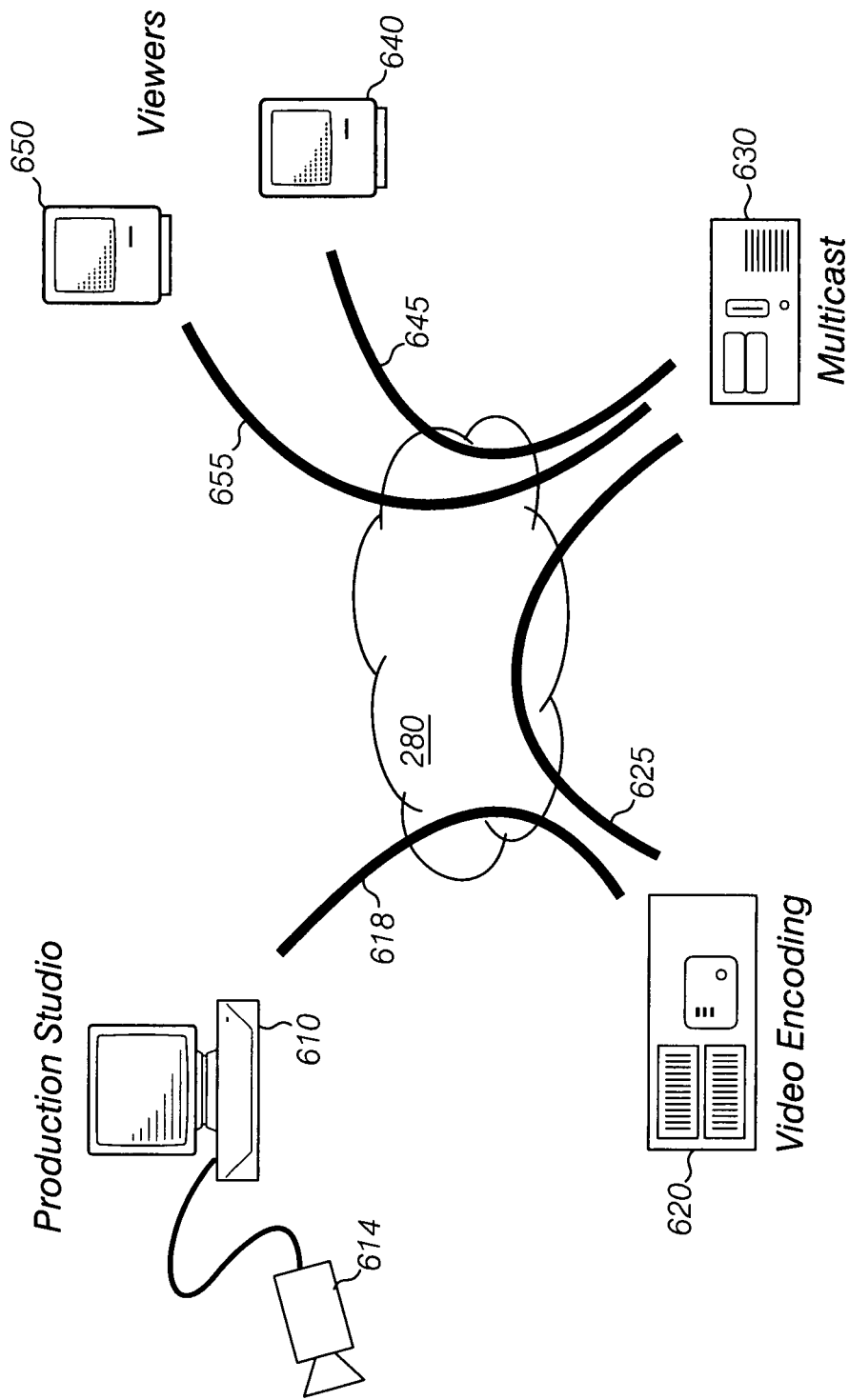
FIG. 6 shows a practical environment where an embodiment of the invention can be used.

FIG. 6 shows an example environment where an embodiment of the invention may be useful. System 610 is a video production studio that digitizes images from video camera 614. System 620 is a video encoding system with special hardware to optimize the time-consuming process of converting video from one format to another. System 630 is a multicaster (broadcaster) that has substantial outbound network resources so that it can send data to many clients simultaneously. A command line (not shown) may be executed at any one of systems 610, 620 and 630 (or at some other system) to arrange for the construction of a data pipeline wherein video data from system 610 is sent over a pipe 618 to system 620. The video data is encoded (e.g. according to one of the Motion Picture Expert's Group ["MPEG"] standards) and sent over pipe 625 to multicast system 630. From system 630, the encoded data may be sent to one or more viewers 640, 650 over network connections 645 and 655. The latter connections would probably be initiated by the corresponding client, and not be included in the command that created the data pipeline from system 610 through system 620 and to system 630. This arrangement (performing video encoding on a separate system) makes sense because encoding computation-intensive task that may be beyond the capabilities of most systems to perform in realtime. Other computationally intensive tasks include audio analysis and transcoding, speech recognition and machine translation. Embodiments of the invention can be used to set up processing pipelines including remote stages (specified by URLs) that perform these tasks at specially-configured servers.

Figure 7:
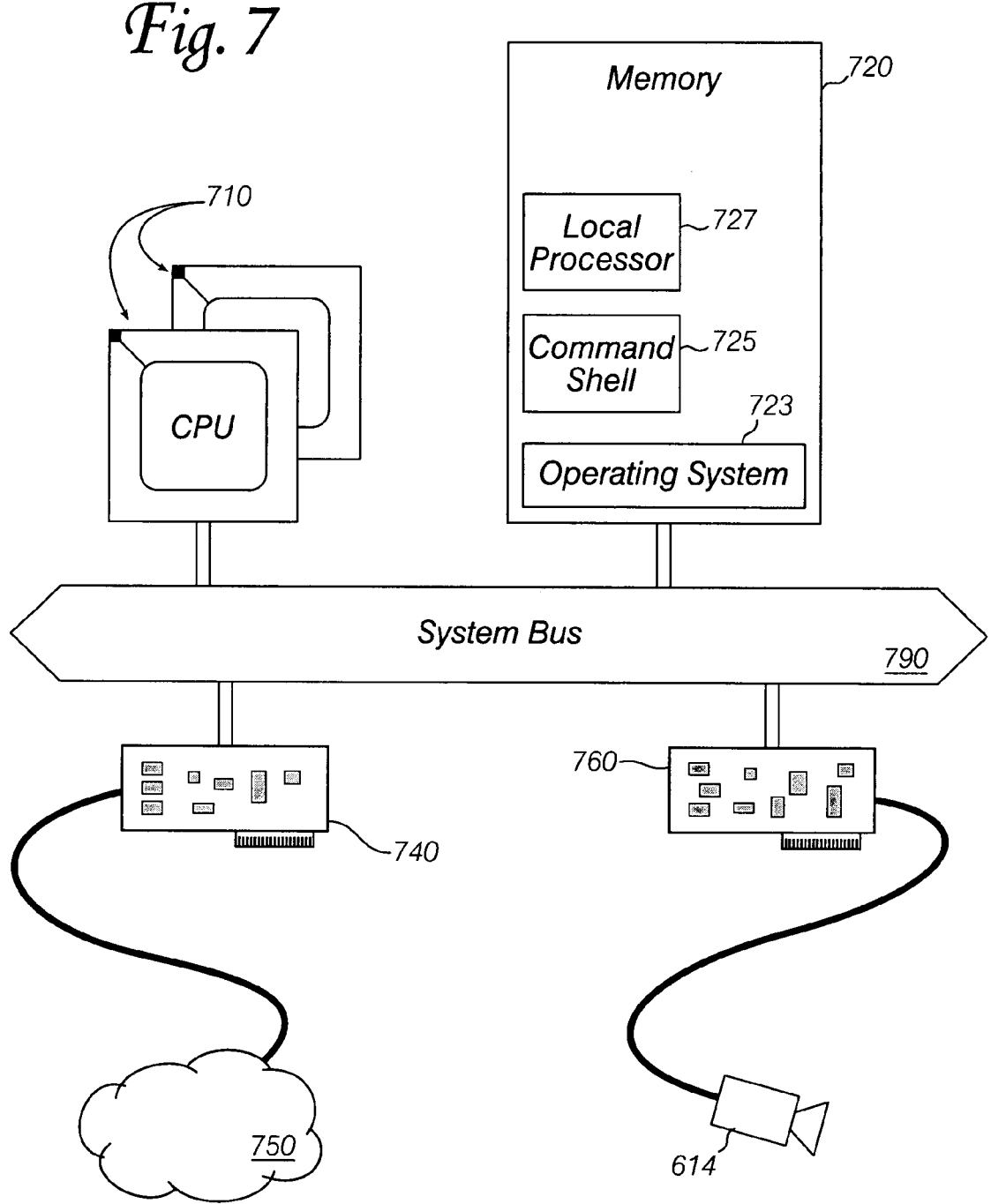
FIG. 7 shows an example computing system including an embodiment of the invention.

FIG. 7 is a block diagram showing some subsystems and components of a computer system that implements an embodiment of the invention. Programmable processors (central processing units or "CPUs") 710 execute instructions in memory 720 to implement an embodiment of the invention. Memory 720 may contain data and instructions to perform basic system functions (operating system 723), and command shell 725 may set up data pipelines including a local process 727, connected to one or more processes executing at other machines (not shown). A network interface card 740 permits the system to connect to a distributed data network 750 such as the Internet, and to exchange data with remote systems. Other specialized hardware such as video capture card 760 may be present; this system can receive video images from camera 614. The aforementioned components are connected to, and can exchange data and control signals over, system bus 790.

Figure 8:
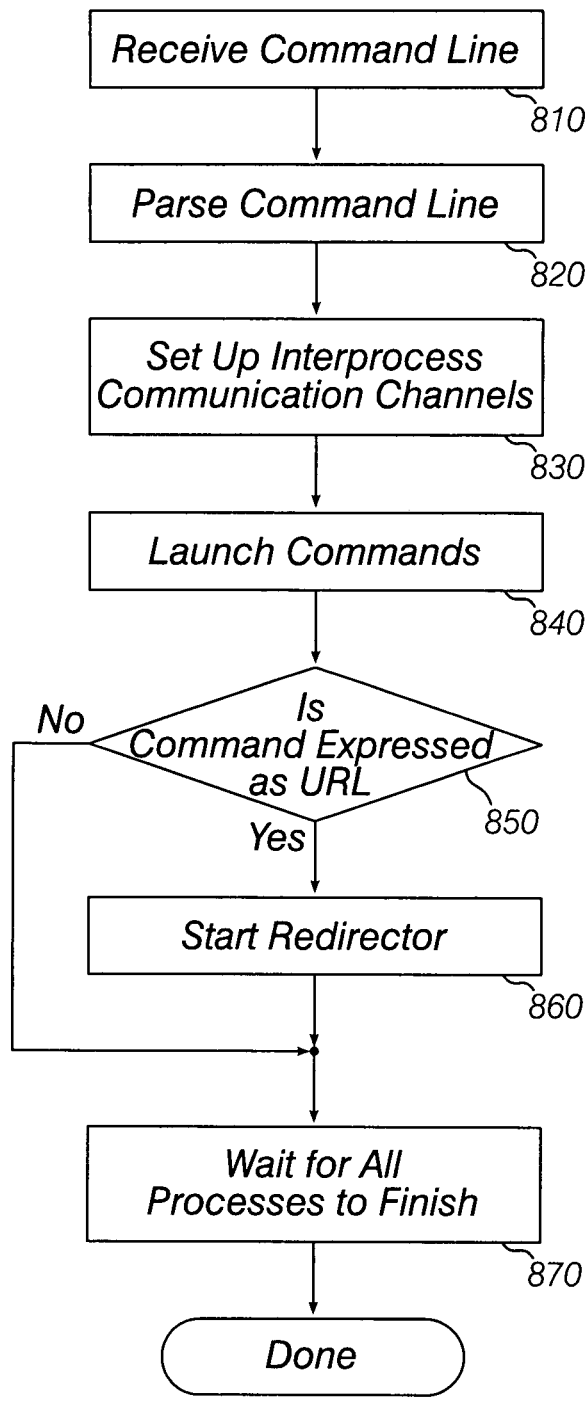
FIG. 8 is a flow chart outlining operations of a command shell that implements an embodiment of the invention.

FIG. 8 is a flow chart outlining operations of a command shell that implements an embodiment of the invention. The shell receives a text command line expressing the data processing pipeline that it is to set up (810). This command line may have been typed interactively by a user at a command prompt, obtained by the shell during its execution of a series of commands in a shell script, or created by another program and supplied to a non-interactive shell invoked by the program via the system (or similar) function call. The command line is parsed (820) to determine what commands are to be executed and how the commands' inputs and outputs are to be connected. To this point, the disclosure has focused on the "pipe" ("|") interprocess communication method, but it is appreciated that shells support other forms of input and output redirection. Specifically, the syntax "<file" may be used to express that the first program in the command pipeline is to read its input from the named file (rather than from the shell's standard input), and the notation ">file" means that the output of the last program is to be saved in the named file. An embodiment of the invention may accept the syntax "URL|program" or "program<URL" to indicate that program should be fed the output of a remote process specified by URL, and the syntax "program|URL" or "program>URL" may indicate that the output of program should be sent to the remote process specified by URL. Parsing the command line may identify program names and arguments to control each program's operation.

Interprocess communication channels (e.g., pipes, file redirections, and network connections to remote machines) are created as necessary to carry the data to be processed between various processing steps (830) and then the individual commands are started (840). On Unix systems, starting a command can be accomplished by suitable invocation (by the command shell) of the fork and exec system calls. Before the exec operation, file descriptors of the interprocess communication channels are rearranged so that the newly-started process obtains its input from, and sends its output to, the desired preceding or succeeding process. Starting processes and arranging file descriptors are within the capabilities of those of ordinary skill in the art.

If a command is expressed as a URL (or other notation indicating a remote processing step) (850), the shell may create a redirector process (860) as discussed in reference to FIGS. 4 and 5 to forward data from a local pipe to the remote process, and to forward data returned from the remote process to the next processing stage. A redirector may be responsible for establishing connections to and from the remote machine, and for invoking the desired process there.

Once all the processes and interprocess communication mechanisms are established and operating, the shell simply waits for all of the processes to complete (870).

Figure 9:
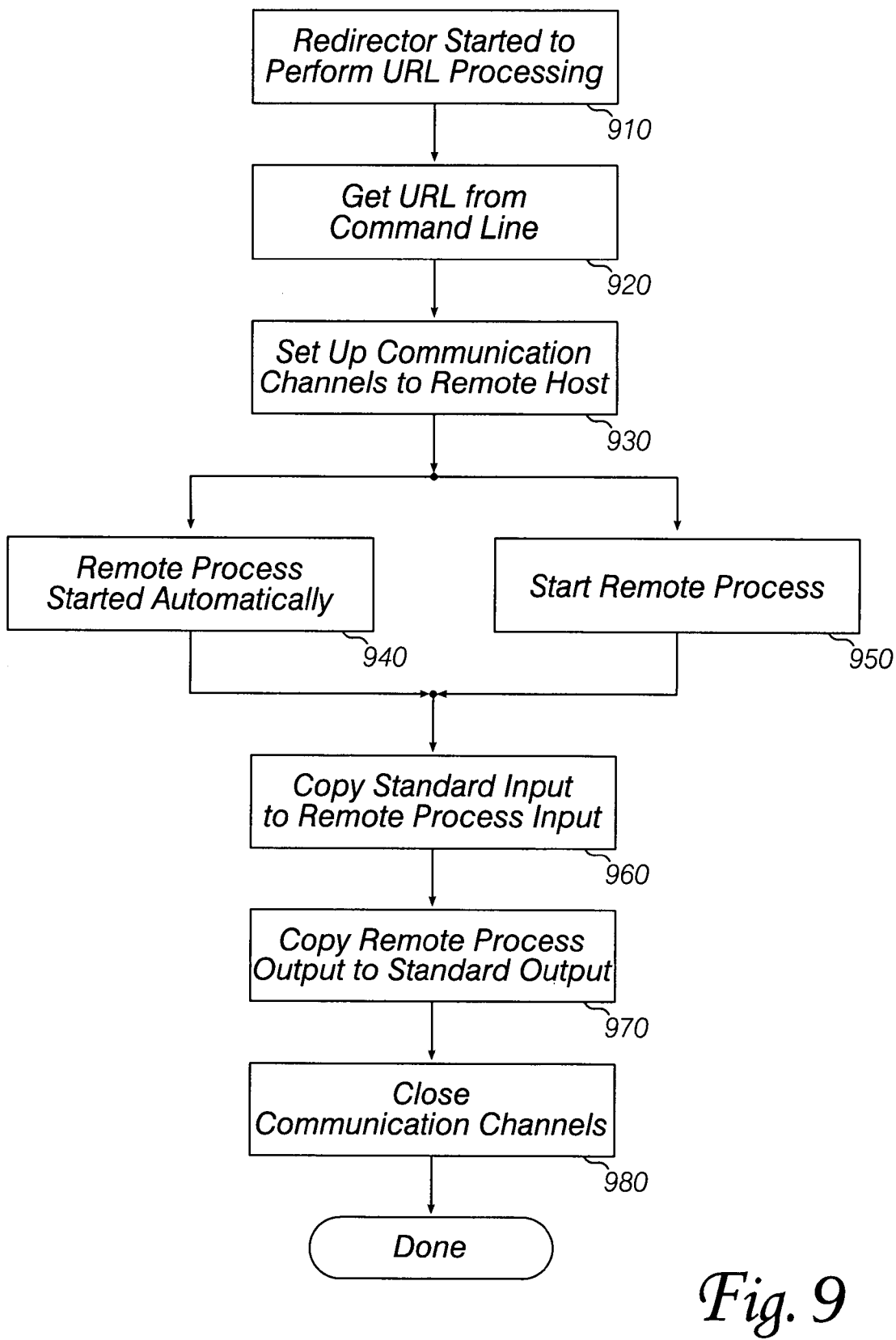
FIG. 9 is a flow chart outlining operations of a redirector process that may be used with some embodiments of the invention.

FIG. 9 outlines the operations of a redirector process, which can be used in some embodiments to add URL-processing capabilities to ordinary command interpreters. The redirector is started by a command shell to perform a portion of a data processing pipeline specified by a URL in the command line (910). The command shell arranges for the standard input and standard output of the redirector to be connected to appropriate preceding and following processing stages, as explained above. The redirector obtains the URL (or equivalent information) from its command line (920) and sets up a bidirectional communication channel to the system identified in the network location portion of the URL (930). This communication channel may be, for example, a TCP/IP connection. Secure communication channels (e.g., a Secure Sockets Layer ["SSL"] connection) may be used in some instances. In some scenarios, the establishment of the communication channels may automatically launch the desired data processing operation at the remote machine (940), while in others, the redirector must invoke a function of the remote machine to start the data processor (950).

Now, while data is available on the redirector's standard input, this data is copied to the input of the remote processor (960); and while data is available on the output of the remote processor, this data is copied to the redirector's standard output (970). When both input and output streams have been exhausted, the redirector closes the communication channels (980) and exits.

Given a redirector that operates along the lines of the flow chart of FIG. 9, a prior-art command interpreter can be made to implement an embodiment of the invention by, for example, creating a hard or symbolic link to the redirector, the link named after the URL that it is desired to support. When the command interpreter encounters this URL in command pipeline, it will start the redirector, which can obtain the URL from its command line. Although this embodiment is not as efficient as one where the command interpreter itself recognizes URLs and sets up direct connections to remote hosts (as described in reference to FIG. 5), it is somewhat easier to implement, and (except for performance issues) is indistinguishable to an end user. Therefore, a redirector-based embodiment may be implemented to give users early access to this new functionality, while the more complicated command-shell support is readied.

With a hard- or symbolic-link version of the invention, it may be inconvenient to create links for every related URL that might be used in a pipeline. For example, consider a URL specifying a data-format converter: http://service.example- .com/convert?format=desired-output-format Rather than create a differently-named link for each potential output format, a redirector according to an embodiment of the invention may translate ordinary Unix command-line arguments (typically introduced by a hyphen, '-') into a parameter portion of the URL. For example, given this command line: prog1|http://service.example.com/convert-format=png|prog2 the redirector invoked to handle the URL might translate the "-format=png" argument into a "?format=png" URL parameter when contacting the remote machine, service.example.com, to request the conversion service. (This example command line would send the output of prog1, presumably an image, to service.example.com to be converted to Portable Network Graphics ("PNG") format, and provide the PNG-converted image to prog2.)

An embodiment of the invention may be a machine-readable medium having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In the preceding description, numerous details were set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

The applications of the present invention have been described largely by reference to specific examples and in terms of particular allocations of functionality to certain hardware and/or software components. However, those of skill in the art will recognize that data processing pipelines specified by a text-string command executed by a command interpreter can also be prepared by software and hardware that distribute the functions of embodiments of this invention differently than herein described. Such variations and implementations are understood to be captured according to the following claims.

I claim:

1. A method comprising:
  receiving, by a first computer system, a command line identifying a plurality of processes as a command pipeline;
  parsing the command pipeline to separate the plurality of processes, an input of each process except a first process to come from an output of a preceding process, and an output of each process except a last process to go to an input of a succeeding process;
  determining whether one of the plurality of processes is expressed in the command line as a Uniform Resource Locator ("URL") of a service operating at a second computer system that is a remote machine with respect to the first computer system;

if the one of the plurality of processes is expressed in the command line as the URL, starting a helper process at the first computer system, wherein the helper process is to transmit data from an output of the first process to an input of the one of the plurality of processes;

causing the one of the plurality of processes to be executed remotely at the second computer system using the output of the first process on the first computer system as an input to the one of the plurality of processes; and if the one of the plurality of processes is not expressed in the command line as the URL, executing the one of the plurality of processes locally at the first computer system.

2. The method of claim 1 wherein the text string comprises a plurality of commands separated by vertical bar ("pipe") symbols.

3. The method of claim 1 wherein the text string comprises exactly one input redirection introduced by a less-than ('<|) symbol.

4. The method of claim 1 wherein the text string comprises exactly one output redirection introduced by a greater-than ('>|) symbol.

5. The method of claim 1 wherein the command pipeline comprises a Transmission Control Protocol ("TCP") connection from the first computer system to the different system.

6. The method of claim 1, further comprising:
starting another process at the first computer system, wherein an input of the other process is connected to an output of the one of the plurality of processes.

7. The method of claim 1, further comprising:
starting another process at a second, different system, wherein an output of the one of the plurality of processes is transmitted directly to an input of the other process.

8. A non-transitory machine-readable storage medium containing data and instructions to cause a programmable processor to perform operations comprising:
receiving a command line identifying a plurality of processes as a command pipeline;
parsing the command pipeline to separate the plurality of processes, an input of each process except a first process to come from an output of a preceding process, and an output of each process except a last process to go to an input of a succeeding process;
determining whether any of the plurality of processes is expressed in the command line as a Uniform Resource Locator ("URL");
if one of the plurality of processes is expressed in the command line as the URL, obtaining the URL to identify a resource at a remote system, the URL being obtained from a command-line parameter identifying the one of the plurality of processes;
creating a redirector process;
establishing, by the redirector process, a connection to the resource at the remote system;
transmitting, by the redirector process, an output of a preceding local process on a local machine, to the resource at the remote system via the connection;
receiving, by the redirector process, output data from the resource at the remote system via the connection; and
writing, by the redirector process, the output data on a standard output;
if one of the plurality of processes is not expressed in the command line as the URL, executing a corresponding process at the local machine.

9. The non-transitory machine-readable storage medium of claim 8, containing additional data and instructions to cause the programmable processor to perform operations comprising:
launching a data processing utility at the remote system.

10. The non-transitory machine-readable storage medium of claim 8, containing additional data and instructions to cause the programmable processor to perform operations comprising:
obtaining an argument from the command-line parameter; and
modifying a request for the resource at the remote system according to the argument.

11. The non-transitory machine-readable storage medium of claim 10 wherein modifying the request for the resource comprises converting the argument to a URL parameter.

12. The non-transitory machine-readable storage medium of claim 8 wherein the connection is a Transmission Control Protocol ("TCP") connection.

13. The non-transitory machine-readable storage medium of claim 8 wherein the connection is a Secure Sockets Layer ("SSL") connection.

14. A non-transitory machine-readable storage medium containing data and instructions to cause a programmable processor to perform operations comprising:
receiving a text string entered via a command line user interface, the text string identifying a plurality of processing stages as a command pipeline;
parsing the command pipeline to separate the plurality of processing stages, an input of each stage except a first stage to come from an output of a preceding stage, and an output of each stage except a last stage to go to an input of a succeeding stage;
determining whether at least one of the plurality of processing stages is expressed in the text string as a Uniform Resource Locator ("URL"); and
launching a process for each of the plurality of processing stages, wherein launching the process comprises:
if a corresponding processing stage is expressed in the text string as the URL, starting a helper process at a local machine, wherein the helper process is to transmit data from the output of the preceding stage performed locally to the input of the process executing remotely;
causing the corresponding processing stage to be performed by the process executing at a remote machine using the output of the preceding stage performed on a local machine as the input to the remote process performing the corresponding processing stage specified by the URL; and
if the corresponding processing stage is not expressed in the text string as the URL, performing the corresponding processing stage by the process executing at the local machine.

15. The non-transitory machine-readable storage medium of claim 14, containing additional data and instructions to cause the programmable processor to perform operations comprising:
using information in the URL to identify a network location of the remote machine and a resource of the remote process.

16. The non-transitory machine-readable storage medium of claim 14, containing additional data and instructions to cause the programmable processor to perform operations comprising:

identifying two successive Uniform Resource Locators ("URLs") in the text string, each URL corresponding to one of the at least one processing stages to be performed by a remote process;

establishing a first data connection to send data to a first remote machine corresponding to a first of the two successive URLs;

establishing a second data connection to receive data from a second remote machine corresponding to a second of the two successive URLs; and establishing a third data connection to carry data from the first remote machine directly to the second remote machine.

17. A system comprising:

a memory; and a processor, coupled to the memory, to:

receive a command string identifying a plurality of sequential pipeline stages as a command pipeline;

parse a command string into the plurality of sequential pipeline stages, wherein an output of an earlier pipeline stage is fed to an input of a succeeding pipeline stage;

execute a local pipeline stage of the plurality of sequential pipeline stages at a local system;

determine that one of the plurality of sequential pipeline stages is a remote pipeline stage if the one of the plurality of sequential pipeline stages is expressed as a Uniform Resource Locator ("URL");

if one of the plurality of sequential pipeline stages is expressed as a URL, create a redirector to setup a communication channel to a remote system specified by the URL, wherein the redirector is to transmit data from the output of the earlier pipeline stage performed locally to the input of the remote pipeline stage;

causing the remote pipeline stage of the plurality of sequential pipeline stages to be executed at the remote system;

receive an output of the remote pipeline stage by the redirector;

if one of the plurality of sequential pipeline stages is not expressed in the text string as the URL, performing a corresponding processing stage at the local machine.

18. The system of claim 17 wherein the remote pipeline stage is to perform one of video encoding, audio encoding, speech recognition or machine translation.

* * * * *

UNITED STATES PATENT AND TRADEMARK OFFICE
CERTIFICATE OF CORRECTION

PATENT NO. : 8,417,819 B2  
APPLICATION NO. : 11/982980  
DATED : April 9, 2013  
INVENTOR(S) : Steven W. Parkinson Page 1 of 1

It is certified that error appears in the above-identified patent and that said Letters Patent is hereby corrected as shown below:

In the Claims

Claim 3, Col. 9, Line 18, "('<|)" should be --('<')--  
Claim 4, Col. 9, Line 22, "('>|)" should bee --('>')--

Signed and Sealed this  
Second Day of July, 2013

Teresa Stanek Rea  
*Acting Director of the United States Patent and Trademark Office*